Jan. 13, 1942. G. JAEGER 2,269,534
SELF-WINDING REEL
Filed March 17, 1939 3 Sheets-Sheet 1

Inventor
Gebhard Jaeger
By W. S. McDowell
Attorney

Jan. 13, 1942.  G. JAEGER  2,269,534
SELF-WINDING REEL
Filed March 17, 1939  3 Sheets-Sheet 2
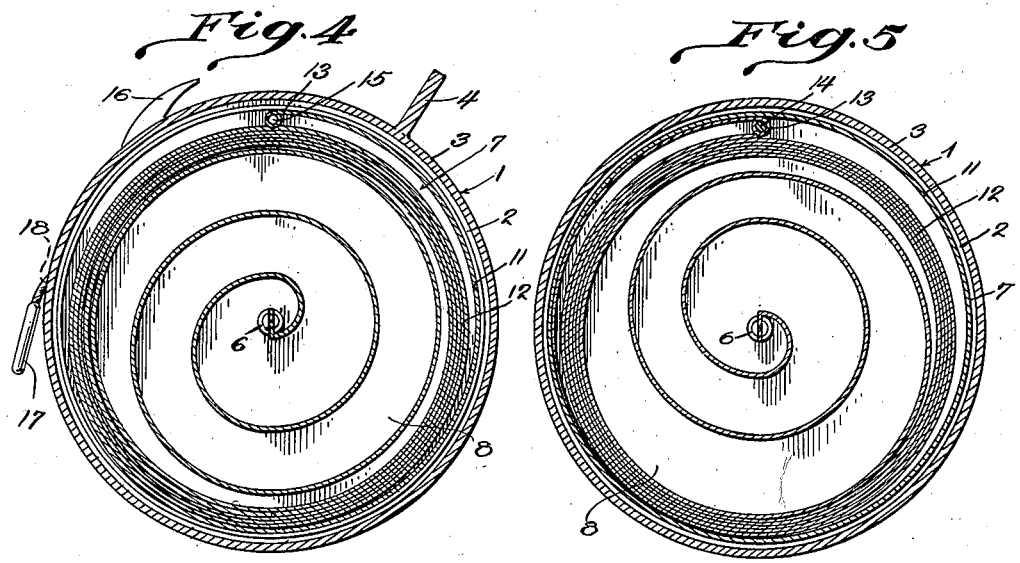
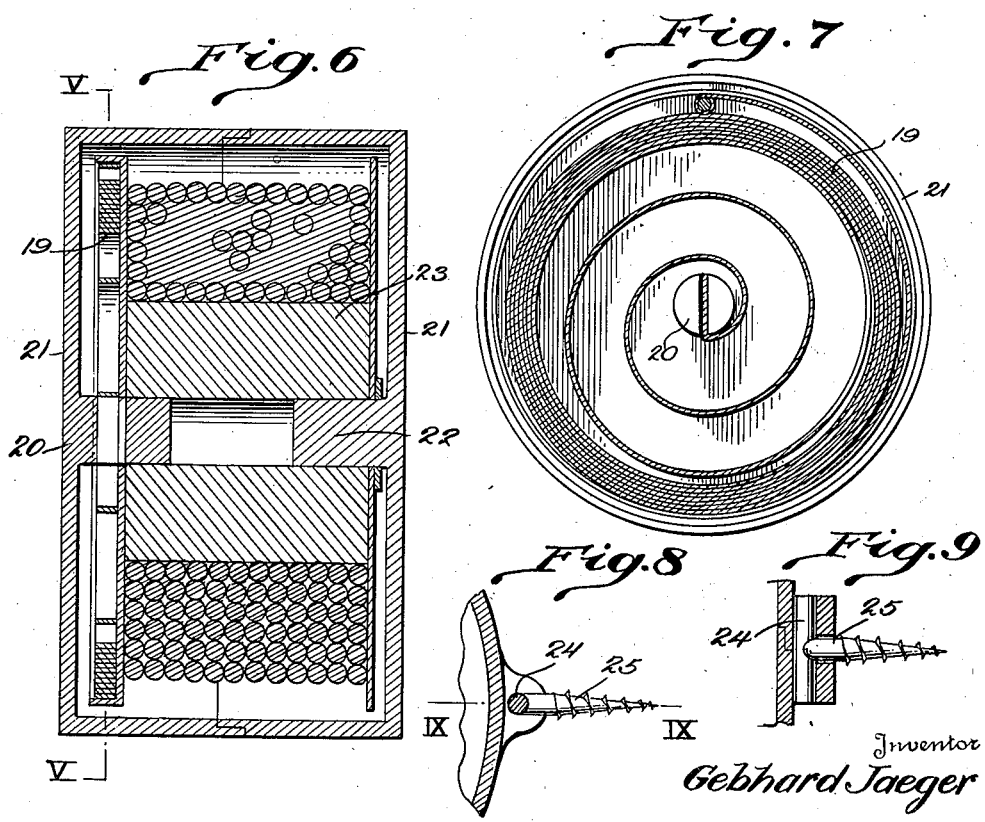
Inventor
Gebhard Jaeger
By W. S. McDowell
Attorney Jan. 13, 1942.　　　　G. JAEGER　　　　2,269,534
SELF-WINDING REEL
Filed March 17, 1939　　　3 Sheets-Sheet 3

Inventor
Gebhard Jaeger

By　W. S. McDowell
Attorney

Patented Jan. 13, 1942

2,269,534

UNITED STATES PATENT OFFICE 2,269,534

SELF-WINDING REEL

Gebhard Jaeger, Columbus, Ohio

Application March 17, 1939, Serial No. 262,481

2 Claims. (Cl. 242—102)

This invention relates to reel mechanisms and is particularly directed to reels of the self-winding type adapted for the reception of clotheslines. The primary object of this invention resides in the provision of a self-winding reel which will be compact and yet receive a line of considerable length.

It is also an object to provide a reel having a spring which will be wound as the line is drawn from the reel, the spring being of such size and shape that the resistance offered to the outward motion of the line will not be excessive and yet will be substantially uniform throughout the entire unreeling operation.

A further object of the invention rests in the provision of a reel mechanism having a plurality of relatively small springs connected to one another in a novel manner which gives the same effect as a very large spring and yet permits the size of the device to be maintained at a minimum.

A still further object resides in forming a reel of the type mentioned with a casing in which is revolubly supported a spool-like receiver, a spiral spring being positioned within the casing and connected to it and the receiver to revolve the receiver in the direction to wind the line thereon, the receiver being provided with flange means to engage the outer convolutions of the spring and hold them free from engagement with the inner surface of the casing, thus eliminating friction and facilitating the operation of the mechanism.

Another object is the provision of a reel in which the line and the receiver therefor are almost entirely enclosed in order that the line will be kept clean and always ready for use.

Additional objects will be brought to mind from the following description and the accompanying drawings in which the invention has been illustrated in several of its most desirable forms.

In the drawings:

Fig. 4 is a similar view on the plane indicated by the line IV—IV of Fig. 2;

Fig. 5 is also a similar view on the plane indicated by the line V—V of Fig. 2;

Fig. 6 is a vertical transverse sectional view taken through a modified form of the reel;

Fig. 7 is a vertical longitudinal sectional view taken on the plane indicated by the line VII—VII of Fig. 6;

Fig. 8 is a detail vertical sectional view taken through means provided with the reel casing to secure it to a support;

Fig. 9 is a detail horizontal sectional view taken on the plane indicated by the line IX—IX of Fig. 8;

Figure 1:
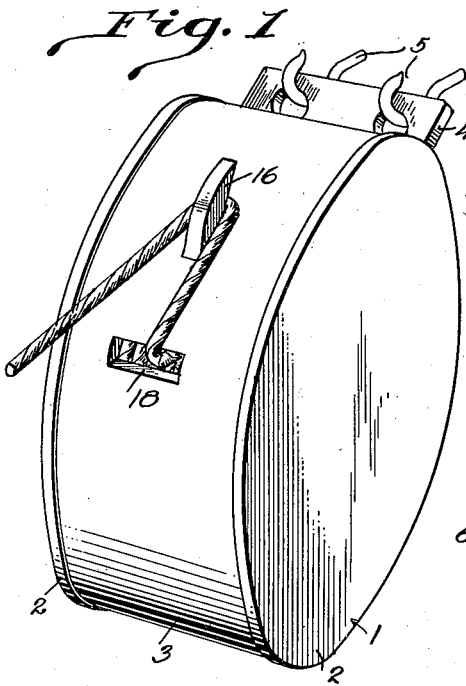
Fig. 1 is a perspective view of a self-winding reel formed in accordance with the present invention and showing the reel in active use.
Figure 2:
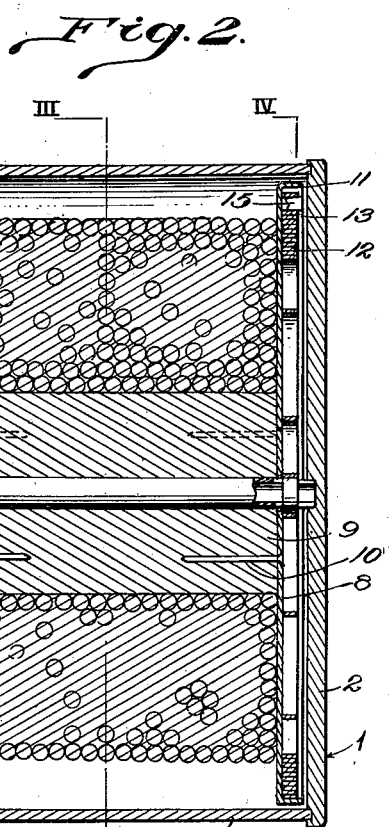
Fig. 2 is a vertical transverse sectional view taken through the reel shown in Fig. 1.
Figure 3:
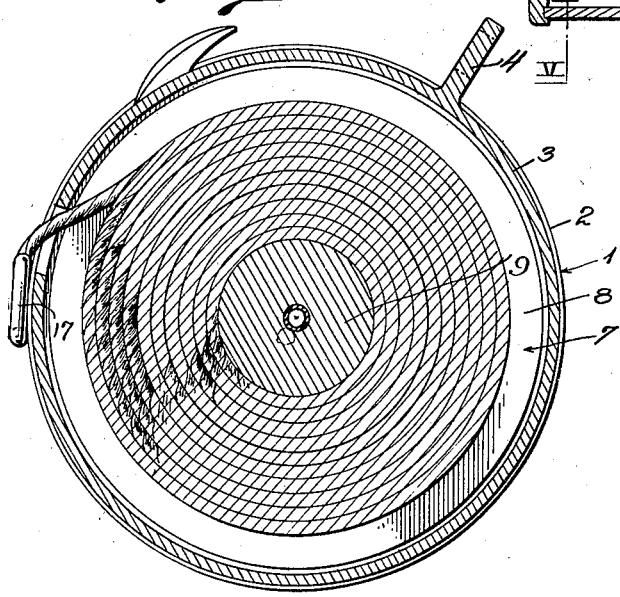
Fig. 3 is a vertical longitudinal sectional view taken through the reel on the plane indicated by the line III—III of Fig. 2.

Referring more particularly to the drawings, Figs. 1 to 5 inclusive show a reel designed to receive a line having considerable length. This reel includes a casing 1 formed of a pair of circular end members 2 secured by cement or other adhesive to the ends of a tubular body 3. The latter member is provided with a fin 4 having openings through which hooks 5 may pass in securing the reel to a support. The end members 2 are provided at their centers with recesses to rotatably receive a tubular shaft 6. Revolubly supported by the shaft is a spool-like line receiver 7 which is formed from a pair of circular end plates 8 secured to the ends of a cylindrical core 9.

In the form of the invention shown, the core is composed of wood and the end plates are secured thereto by small nails 10. It is apparent that the core could be formed of any suitable material, wood being employed in this instance because of its low cost and the ease with which the plates may be secured thereto. At their outer edges, the plates each carry a laterally projecting annular flange 11. These flanges are slightly spaced from the end members and provide circular chambers for the reception of springs 12 provided for the purpose of rotating the receiver during the line winding operation.

The springs 12 are of the spiral type and are formed of flat strip material and have loops 13 formed with their outer ends. The looped end of one spring is positioned on a boss 14 projecting from the inner surface of one of the end members 2. The looped end of the other spring surrounds a similar boss 15 projecting from the outer surface of the end plate of the receiver at the end farthest from the end wall on which the projection 14 is formed. The inner ends of the springs are positioned in slots formed in the shaft 6 which connects the springs at their inner ends. The convolutions of the springs are wound in the opposite directions in order that when the springs are wound, the center convolutions will be wound first.

The spring shown in Fig. 4 is connected at its outer end with the receiver and when the line is drawn from the reel, this spring will be wound about the shaft 6. After this spring has been wound to such an extent that it overcomes the resistance of the spring at the opposite end, this latter spring will be wound from rotary movement of the shaft 6. The outer end of this latter spring is held stationary through its engagement with the casing. When as much of the line as it is desired to use has been drawn from the reel, the line adjacent to the reel is positioned in a V-shaped recess formed between a projection 16 and the outer surface of the casing. When the line is thus positioned, the force of the spring cannot draw the line back into the reel nor can force applied to the end of the line withdraw more line from the reel.

After the operator has finished using the line, it is freed from engagement with the member 16 and the outer end is then released to permit the springs to unwind and impart rotary movement to the receiver for the purpose of winding the line thereon. The outer end of the line has a ring member 17 secured thereto to prevent the line from being completely drawn into the casing through the opening 18.

In the form of the invention shown in Figs. 6 and 7, the reel is provided with a single spring 19. The inner end of this spring is positioned in a slot formed in a boss 20 molded integrally with the end wall of the casing. The casing comprises a pair of cup-like sections 21 which are joined at their open ends. The tubular body of the preferred form of reel has been eliminated, the side walls of the cup sections taking the place of this member. The shaft 6 has also been eliminated, the bosses 20 and 22 taking the place of this member in forming the pivotal support for the line receiver 23. The receiver 23 is similar to the receiver in the preferred form with the exception that the flange has been eliminated from one of the end plates. It is, of course, obvious that this reel could not accommodate as long a line as the reel in the preferred form, the latter reel being provided for use where the long line is unnecessary.

In Figs. 8 and 9, the casing sections are provided with bosses which register with one another when the sections are in assembled order. These bosses have registering perforations for the reception of the cross bar 24 of a T-shaped screw 25. To secure the reel having this type of mounting, it is merely necessary to start the screw into the support, then turn the casing of the reel until the screw has been embedded in the support a sufficient distance to withstand the load imposed on the line when in use.

Figure 10:
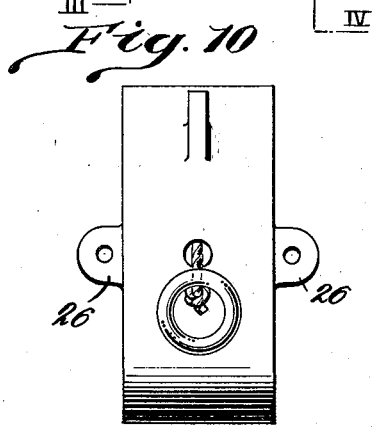
Fig. 10 is a front elevational view of a reel, this reel being provided with a modified form of means for securing it to a support.

In Fig. 10, the reel is provided at the rear portion with spaced ears 26 having perforations for the reception of the separate screws employed in permanently fastening the reel to the support. In both forms of the invention shown, the casing is composed of molded plastic material but the casing could be manufactured from metal or any other suitable material. In every instance, the inner end of the line is permanently secured to the core of the receiver to prevent the line from being completely withdrawn from the casing and the receiver being rotated without the line being wound thereon. In some reels, it has been found desirable to secure the center portion of a line to the core in order that two ends will extend from the reel.

At the time the springs are completely unwound, the outer convolutions will engage the inner surfaces of the flanges and be held free from contact with the inner surface of the body of the casing. This feature is desirable to prevent friction from interfering with the operation of the device.

Figure 11:
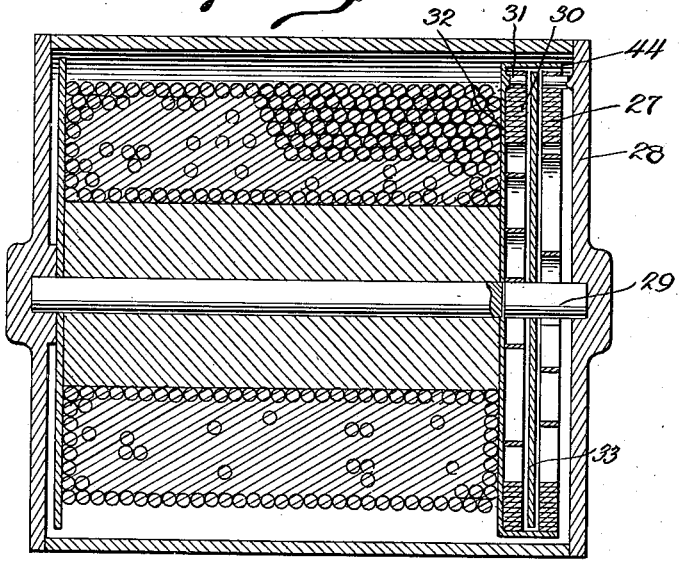
Figs. 11 and 12 are vertical transverse sectional views taken through further modified forms of reels.

In certain instances, it may be found impossible to employ springs at each end of the reel and yet a single spring reel will not accommodate a sufficient length of line. In such cases, the reel may be formed as shown in Fig. 11 wherein both springs of the reel are positioned at the same end of the supporting frame or casing. In this form, one spring 27 has its outer end connected with a boss secured to the end wall 28 of the casing, and the inner end fixed to the rotatable shaft 29. The inner end of the second spring 30 is also fixed to the shaft which serves to connect the springs together. The outer end of the second spring is connected by the boss 31 to the line receiver 32 mounted for rotation on the shaft 29.

Figure 12:
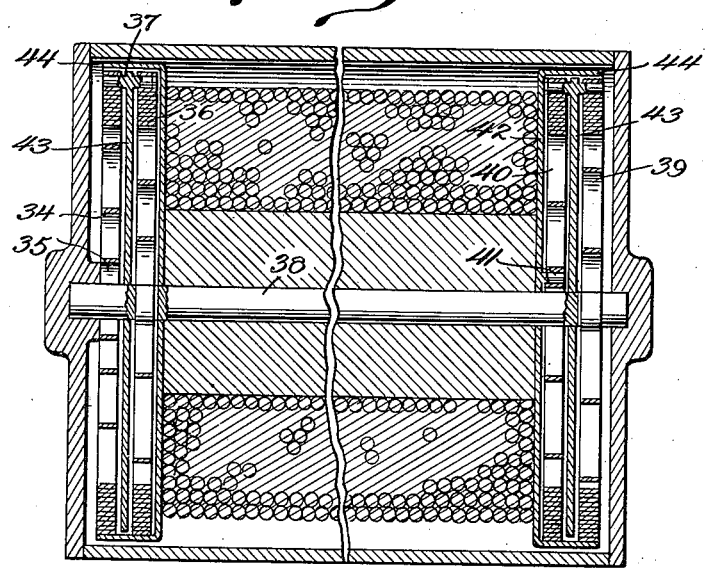

When the receiver is rotated by the operation of drawing the line from the receiver, the springs will be wound in the same manner as in the form first described. When the line is released, the springs will operate to rotate the receiver and rewind the line. A plate 33 is disposed between the springs to prevent the convolutions thereof from engaging one another and becoming entangled.

Where it is desired to provide a reel for a line of extreme length, a plurality of sets of springs may be provided as shown in Fig. 12. In this form of the invention, a set of two springs is positioned at each end of the reel. One end of the first spring 34 of one set is connected to the reel frame as at 35 and the opposite end is connected with the similar end of the second spring 36 as shown at 37. The opposite end of the latter spring is connected by means of the floating shaft 38 with one end of the first spring 39 of the second set which has its opposite end connected with the corresponding end of the second spring 40 of this set. The other end of the last-mentioned spring is connected as at 41 with the receiver 42.

As the line is drawn from the receiver 42, the spring 40 will be wound. When the resistance to the winding force of the spring 40 becomes greater than that offered by the spring 39, the latter will commence to wind and when the resisting force of this latter spring becomes greater than that offered by the spring connected to the shaft 38 at the opposite end of the reel, this latter spring will start to wind. The last spring 34 or the spring connected with the housing will start to wind when the spring 36 has been wound sufficiently to permit its resistance to the winding force to overcome that offered by the spring 34. It is relatively unimportant in which order the springs are wound so long as the effect of a single spring of substantially uniform tension is produced and it is clearly evident from the showings in the various figures of the drawings that such will be the effect of the spring arrangements shown. The separator plates 43 are positioned between the springs of the reel shown in Fig. 12 to prevent their relative engagement and consequent fouling of one another. In both Figs. 11 and 12, the receivers are illustrated as having flanges 44 which overhang the springs and prevent the engagement thereof with the body wall of the casing.

While a number of modifications of the invention have been illustrated, other forms may be employed without departing from the spirit and scope of the invention as defined in the following claims.

I claim:

1. In a self-winding reel of the type having a hollow casing with an opening therein, a line receiving reel journaled within said casing, a flexible line secured to said reel and extending through the opening in said casing, and spring means mounted within said casing for imparting rotary movement to said reel, a projection provided on the outer surface of said casing at a point where said surface is substantially parallel to the direction of movement of the line from the reel, the line-engaging edge of said projection remote from said opening being disposed at an acute angle to the adjacent surface of said casing whereby the line may be wedged between said edge and said surface, the arrangement of the parts being such that the angle between said edge and said surface opens in a direction substantially opposite to the direction of movement of the line from the reel.

2. In a self-winding reel of the type having a hollow casing with an opening therein, a line receiving reel journaled within said casing, a flexible line secured to said reel and extending through the opening in said casing, and spring means mounted within said casing for imparting rotary movement to said reel, means carried by said casing in spaced relation from said opening for securing the casing to a support, and a projection formed on the casing between said securing means and said opening at a point where the surface of the casing is substantially parallel to the direction of movement of the line from the reel, said projection being directed toward said securing means to provide a line-engaging edge disposed in acute angular relationship with the adjoining portion of said casing whereby the line may be wedged between said edge and said casing, the arrangement of the parts being such that the acute angle formed by said edge and said casing opens in a direction substantially opposite to the direction of movement of the line from the reel.

GEBHARD JAEGER.